United States Patent
Yang et al.

(10) Patent No.: US 9,571,314 B1
(45) Date of Patent: Feb. 14, 2017

(54) SYSTEMS AND METHODS FOR JOINT DEMODULATION AND DEMAPPING

(71) Applicant: QUALCOMM Incorporated, San Diego, CA (US)

(72) Inventors: Yu-Han Yang, Santa Clara, CA (US); RaviKiran Gopalan, Solana Beach, CA (US); Markos Troulis, San Diego, CA (US); Seyed Mohammad Ehsan Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/863,418

(22) Filed: Sep. 23, 2015

(51) Int. Cl.
*H04B 1/7093* (2011.01)
*H04L 27/14* (2006.01)
*H04L 27/12* (2006.01)
*H04L 27/38* (2006.01)

(52) U.S. Cl.
CPC .............. *H04L 27/14* (2013.01); *H04L 27/12* (2013.01); *H04L 27/3872* (2013.01)

(58) Field of Classification Search
CPC ...... H04L 27/22; H04L 1/0687; H04L 1/0693; H04L 2027/0024; H04L 2027/0053; H04L 25/03019; H04L 25/03305; H04L 25/03318; H04L 25/03949; H04L 25/067; H04L 1/0054; H04L 27/38; H04B 1/709; H04B 7/08; H04B 1/7093
USPC ................................. 375/265, 340, 341, 343
See application file for complete search history.

(56) References Cited

U.S. PATENT DOCUMENTS

| | | | | |
|---|---|---|---|---|
| 6,349,110 B1* | 2/2002 | Davidovici | .......... | H04B 1/7093 375/130 |
| 6,370,160 B1* | 4/2002 | Knutson | ........... | H04W 56/0085 370/442 |
| 6,438,176 B1 | 8/2002 | Haran et al. | | |
| 6,590,947 B2* | 7/2003 | Kurihara | .............. | H04B 1/7093 375/152 |
| 6,678,310 B1* | 1/2004 | Andren | .................. | H04B 1/707 375/147 |
| 7,359,426 B2* | 4/2008 | Ojard | ................. | H04B 1/71632 375/130 |
| 7,369,633 B2* | 5/2008 | Jiang | ....................... | H04L 7/048 370/503 |
| 7,409,024 B2* | 8/2008 | Ginesi | ................. | H04L 27/0014 375/362 |
| 7,539,167 B2* | 5/2009 | Meilhac | ............... | H04B 1/7085 370/335 |

(Continued)

FOREIGN PATENT DOCUMENTS

EP 2434709 A2 3/2012

OTHER PUBLICATIONS

International Search Report and Written Opinion—PCT/US2016/048942—ISA/EPO—Oct. 17, 2016.

*Primary Examiner* — Emmanuel Bayard
(74) *Attorney, Agent, or Firm* — Austin Rapp & Hardman (57) ABSTRACT

A method for wireless communication is described. The method includes receiving a signal that is pattern-mapped and Gaussian frequency-shift keying (GFSK) modulated. The method also includes performing a joint demapping and demodulation of the received signal based on a stored accumulated phase. The method may further include updating the stored accumulated phase based on the joint demapping and demodulation.

30 Claims, 7 Drawing Sheets

(56) References Cited

U.S. PATENT DOCUMENTS

| | | | | |
|---|---|---|---|---|
| 7,630,428 B2* | 12/2009 | Rasmussen | H04L 27/0014 | 375/145 |
| 7,633,993 B2* | 12/2009 | Ojard | H04L 1/04 | 375/130 |
| 7,796,709 B2* | 9/2010 | Mak | H04L 12/2602 | 375/325 |
| 7,809,086 B2* | 10/2010 | Tingwu | H04L 27/0014 | 329/300 |
| 7,817,759 B2* | 10/2010 | Jiang | H04L 7/048 | 375/326 |
| 7,944,985 B2* | 5/2011 | Elgamal | H04L 1/0003 | 375/267 |
| 8,266,468 B2* | 9/2012 | Behzad | H04B 15/02 | 326/93 |
| 8,275,081 B2* | 9/2012 | Jiang | H04L 7/048 | 375/326 |
| 8,401,118 B2* | 3/2013 | Lakkis | H04J 13/16 | 375/279 |
| 8,446,987 B2* | 5/2013 | Azenkot | H04L 5/02 | 375/340 |
| 8,553,818 B2* | 10/2013 | Chun | H04L 5/0007 | 375/130 |
| 8,705,411 B2 | 4/2014 | Yu et al. | | |
| 8,718,205 B1* | 5/2014 | Morais | H04L 27/38 | 370/329 |
| 8,804,886 B2* | 8/2014 | Wang | H04L 1/005 | 375/260 |
| 9,031,001 B2* | 5/2015 | Yang | H04L 27/2663 | 370/328 |
| 2003/0043947 A1* | 3/2003 | Zehavi | H04L 27/22 | 375/365 |
| 2004/0170120 A1 | 9/2004 | Reunamaki et al. | | |
| 2005/0207519 A1* | 9/2005 | Phang | H04L 27/2278 | 375/354 |
| 2005/0259768 A1* | 11/2005 | Yang | H04L 27/0008 | 375/345 |
| 2006/0193407 A1* | 8/2006 | Dibiaso | H04L 27/2273 | 375/343 |
| 2006/0209982 A1* | 9/2006 | De Gaudenzi | H04L 27/3411 | 375/279 |
| 2008/0159376 A1* | 7/2008 | Yamaguchi | H04L 25/03159 | 375/233 |
| 2010/0260291 A1* | 10/2010 | Hou | H04L 27/0014 | 375/319 |
| 2012/0188994 A1* | 7/2012 | Palanki | H04B 1/69 | 370/344 |
| 2013/0279548 A1 | 10/2013 | Amanullah et al. | | |
| 2014/0241378 A1* | 8/2014 | Vanderhaegen | H04L 1/0003 | 370/465 |
| 2014/0321581 A1 | 10/2014 | Luong et al. | | |
| 2015/0110216 A1 | 4/2015 | Bajcsy et al. | | |
| 2015/0124906 A1 | 5/2015 | Gopalan et al. | | |
| 2015/0270926 A1* | 9/2015 | Eliaz | H04L 25/03178 | 714/776 |
| 2015/0365174 A1* | 12/2015 | Nazarathy | H04L 25/03019 | 398/209 |

* cited by examiner

SYSTEMS AND METHODS FOR JOINT DEMODULATION AND DEMAPPING

TECHNICAL FIELD

The present disclosure relates generally to wireless communications. More specifically, the present disclosure relates to systems and methods for joint demodulation and demapping.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices communicate with other electronic devices. These electronic devices may transmit and/or receive electromagnetic signals. For example, a smartphone may transmit signals to and/or receive signals from another device (e.g., a laptop computer, an electronics console in a vehicle, a wireless headset, etc.). In another example, a wireless headset may transmit signals to and/or receive signals from another device (e.g., a laptop computer, a game console, a smartphone, etc.).

However, particular challenges arise in wireless communications. For example, some wireless communication devices may have a limited range. This limited range may lead to connectivity problems and unsatisfactory performance in some situations. As can be observed from this discussion, systems and methods that improve wireless communications may be beneficial.

SUMMARY

A method for wireless communication is described. The method includes receiving a signal that is pattern-mapped and Gaussian frequency-shift keying (GFSK) modulated. The method also includes performing a joint demapping and demodulation of the received signal based on a stored accumulated phase.

The method may also include updating the stored accumulated phase based on the joint demapping and demodulation.

Performing the joint demapping and demodulation of the received signal may include performing a combined matched filtering and phase rotation of the received signal. The matched filtering may determine the pattern mapping of the received signal. The phase rotation of the received signal may be based on the stored accumulated phase.

The stored accumulated phase may be determined from an output of the combined matched filtering and phase rotation. Performing a combined matched filtering and phase rotation of the received signal may include performing phase rotation using the stored accumulated phase to compensate for a phase of the received signal. Matched filtering may be performed using a resulting phase of the phase rotation to determine an output bit.

The phase rotation based on the stored accumulated phase may occur before matched filtering. Matched filtering may occur before the phase rotation based on the stored accumulated phase.

The stored accumulated phase may be fed back to perform phase rotation of the received signal. Performing the joint demapping and demodulation of the received signal may also include generating a soft input for a Viterbi decoder.

A wireless communication device is also described. The wireless communication device may include a receiver configured to receive a signal that is pattern-mapped and GFSK modulated. The wireless communication device may also include a joint demodulator/demapper configured to perform a joint demapping and demodulation of the received signal based on a stored accumulated phase.

An apparatus for wireless communication is also described. The apparatus includes means for receiving a signal that is pattern-mapped and GFSK modulated. The apparatus also includes means for performing a joint demapping and demodulation of the received signal based on a stored accumulated phase.

A computer-program product for wireless communication is also described. The computer-program product includes a non-transitory tangible computer-readable medium having instructions thereon. The instructions include code for causing a wireless communication device to receive a signal that is pattern-mapped and GFSK modulated. The instructions also include code for causing the wireless communication device to perform a joint demapping and demodulation of the received signal based on a stored accumulated phase.

DETAILED DESCRIPTION

The systems and methods disclosed herein may provide receive (Rx) schemes for performing joint demodulation and demapping. The joint demodulation and demapping described herein may result in better performance compared with non-joint approaches to demodulation and demapping.

The systems and methods described herein may be implemented on a variety of different electronic devices. Examples of electronic devices include general purpose or special purpose computing system environments or configurations, personal computers (PCs), server computers, handheld or laptop devices, multiprocessor systems, microprocessor-based systems, programmable consumer electronics, network PCs, minicomputers, mainframe computers, distributed computing environments that include any of the above systems or devices and the like. The systems and methods may also be implemented in mobile devices such as phones, smartphones, wireless headsets, personal digital assistants (PDAs), ultra-mobile personal computers (UM-PCs), mobile Internet devices (MIDs), etc. Further, the systems and methods may be implemented by battery-operated devices, sensors, etc.

The following description refers to wireless communication devices for clarity and to facilitate explanation. Those of ordinary skill in the art will understand that a wireless communication device may comprise any of the devices described above as well as a multitude of other devices.

The Bluetooth wireless communication standard is typically employed for exchanging communications between fixed or mobile Bluetooth-enabled devices over short distances. In some configurations, the systems and methods disclosed herein may be applied to joint demodulation and demapping of a received signal by Bluetooth low energy long range (LELR) devices. LELR refers to the "Low Energy Long Range" extension of the Bluetooth standard. The LELR extension is focused on energy-constrained applications such as battery-operated devices, sensor applications, etc.

The following description uses terminology associated with the Bluetooth and LELR standards. Nevertheless, the concepts are applicable to other technologies and standards that involve modulating and transmitting digital data. Accordingly, while some of the description is provided in terms of Bluetooth standards, the systems and methods disclosed herein may be implemented more generally in wireless communication devices that may not conform to Bluetooth standards.

A Bluetooth LE device may comprise a transmitter, a receiver, or both a transmitter and a receiver. A Bluetooth LE device may also use a frequency-hopping transceiver to combat interference and fading.

One benefit of the systems and methods described herein is that they may be applied to (e.g., overlaid atop) any existing LE scheme with only minimal changes required. In some configurations, the systems and methods disclosed herein improve the performance of an LE receiver by implementing joint demodulation/decoding at the receiver.

LE systems operate in the unlicensed 2.4 gigahertz (GHz) Industrial-Scientific-Medical (ISM) band at 2.400-2.4835 GHz (2400-2483.5 megahertz (MHz)). The operating frequency bands of LE systems are illustrated in Equation (1). In particular, LE systems use forty radio frequency (RF) channels. These RF channels have center frequencies (f) of 2402+k*2 MHz, where k=0, . . . , 39.

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from those shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
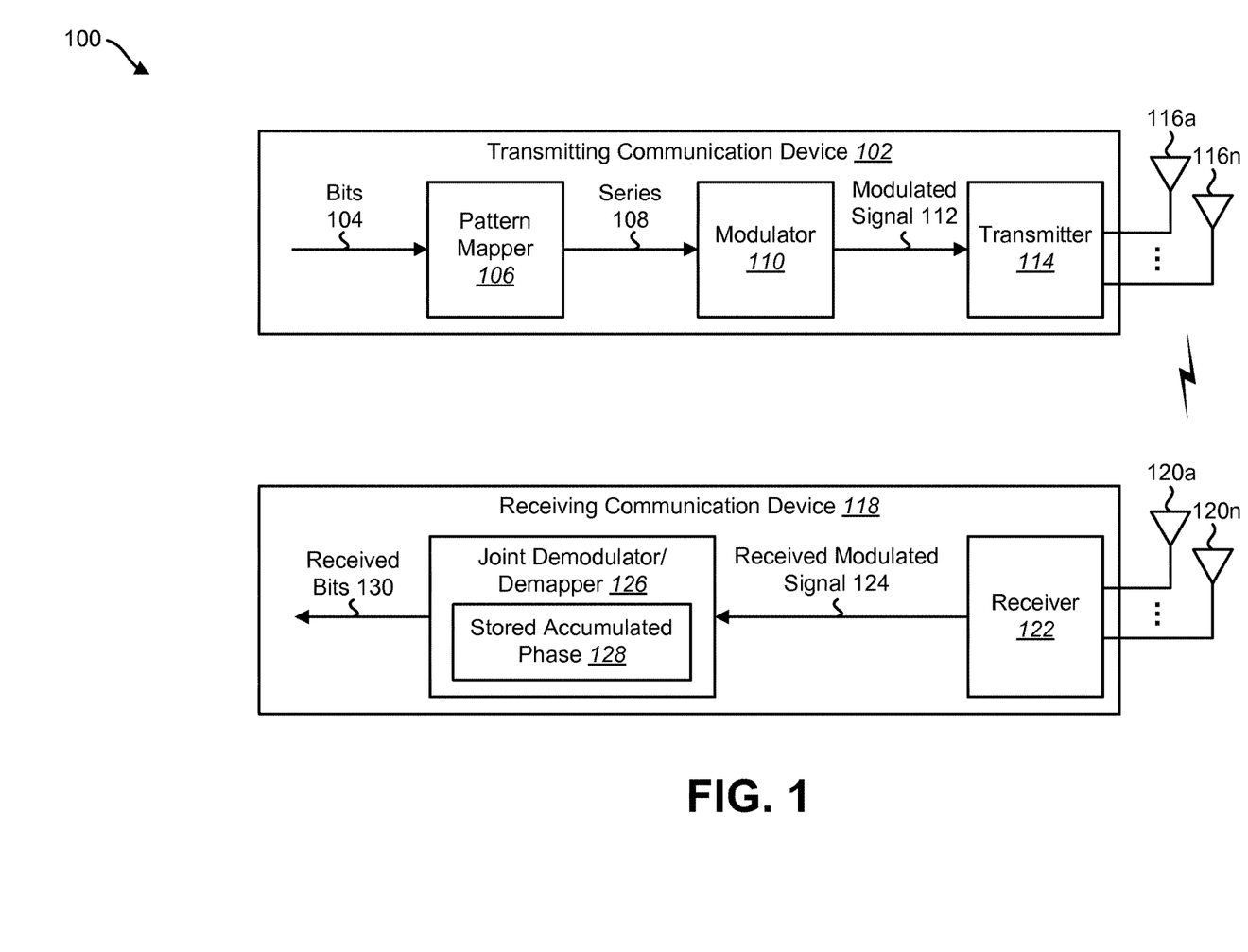
FIG. 1 is a block diagram illustrating one configuration of a receiving communication device in which systems and methods for joint demodulation and demapping may be implemented.

FIG. 1 is a block diagram illustrating one configuration of a receiving communication device 118 in which systems and methods for joint demodulation and demapping may be implemented. The receiving communication device 118 may be included in a wireless communication system 100 that also includes a transmitting communication device 102. Wireless communication systems 100 are widely deployed to provide various types of communication content such as voice, data and so on. The transmitting communication device 102 and the receiving communication device 118 are examples of wireless communication devices.

Although FIG. 1 depicts a transmitting communication device 102 and a receiving communication device 118, a wireless communication device may be capable of both transmitting and receiving. Thus, a single wireless communication device may include all of the components depicted in the transmitting communication device 102 and the receiving communication device 118. In addition, a wireless communication device may include other components not illustrated in FIG. 1. Those skilled in the art will understand that the wireless communication devices of FIG. 1 have been simplified to facilitate explanation.

Communications in the wireless system may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. In some configurations, the wireless communication system 100 may utilize MIMO. A MIMO system may support time division duplex (TDD) and/or frequency division duplex (FDD) systems.

In some configurations, the wireless communication system 100 may operate in accordance with one or more standards. Examples of these standards include Bluetooth (e.g., Institute of Electrical and Electronics Engineers (IEEE) 802.15.1), IEEE 802.11 (Wi-Fi), IEEE 802.16 (Worldwide Interoperability for Microwave Access (Wi-MAX)), Global System for Mobile Communications (GSM), Universal Mobile Telecommunications System (UMTS), CDMA2000, Long Term Evolution (LTE), etc. Accordingly, the transmitting communication device 102 may communicate with the receiving communication device 118 using a communication protocol such as Bluetooth LE or Bluetooth LELR in some configurations.

In some configurations, the wireless communication system 100 may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, General Packet Radio Service (GPRS) access network systems, 3rd Generation Partnership Project (3GPP) Long Term Evolution (LTE) systems, and spatial division multiple access (SDMA) systems.

In LTE and UMTS, a wireless communication device may be referred to as a "user equipment" (UE). In 3GPP Global System for Mobile Communications (GSM), a wireless communication device may be referred to as a "mobile station" (MS). The transmitting communication device 102 and/or the receiving communication device 118 may be referred to as and/or may include some or all of the functionality of a UE, MS, terminal, an access terminal, a subscriber unit, a station, etc. Examples of the transmitting communication device 102 and/or the receiving communication device 118 include cellular phones, smartphones, wireless headsets, wireless speakers, personal digital assistants (PDAs), wireless devices, electronic automobile consoles, gaming systems, wireless controllers, sensors, wireless modems, handheld devices, laptop computers, Session Initiation Protocol (SIP) phones, wireless local loop (WLL) stations, etc.

The transmitting communication device 102 and/or the receiving communication device 118 may include one or more components as illustrated in FIG. 1. For example, the transmitting communication device 102 may include a pattern mapper 106, a modulator 110, a transmitter 114 and/or one or more antennas 116a-n. The receiving communication device 118 may include one or more antennas 120a-n, a receiver 122 and/or a joint demodulator/demapper 126.

It should be noted that fewer or more components may be included in the transmitting communication device 102 and/or the receiving communication device 118. Each of the one or more components may be implemented in hardware or in a combination of hardware and software. For example, the joint demodulator/demapper 126 may be implemented in hardware (e.g., circuitry) or in a combination of hardware and software (e.g., processor with instructions).

Lines and/or arrows in the Figures may indicate a coupling between components. For example, the joint demodulator/demapper 126 may be coupled to the receiver 122, which may be coupled to the one or more antennas 120a-n. As used herein, the term "couple" and variations thereof may denote a direct connection or an indirect connection. For example, the joint demodulator/demapper 126 may be directly connected to the receiver 122 (without any intervening components) or may be indirectly connected to the receiver 122 (through one or more intervening components).

The transmitting communication device 102 may obtain a string of bits 104. Each of the string of bits 104 may have a binary value (e.g., 1 or 0, on or off, etc.). The string of bits 104 may represent data for transmission. For example, the string of bits 104 may represent payload and/or control information. Examples of the information that may be represented by the string of bits 104 may include voice calls, Internet traffic, text messages, error-detecting code, error-correcting code, retransmissions, power control bits, access requests, etc. The string of bits 104 may originate at the transmitting communication device 102 and/or from a remote device. The string of bits 104 may have a rate (R) that may be expressed as bits per second (bps).

Obtaining the string of bits 104 may include generating the string of bits 104 and/or receiving the string of bits 104. For example, the transmitting communication device 102 may capture, digitize and/or encode a voice signal to obtain the string of bits 104. In another example, the transmitting communication device 102 may receive text input from a user, which the transmitting communication device 102 may format into the string of bits 104. In yet another example, the transmitting communication device 102 may receive the string of bits 104 from a remote device (via wired or wireless transmission, for example).

The transmitting communication device 102 may provide the string of bits 104 to the pattern mapper 106. The pattern mapper 106 may receive the string of bits 104 that represent data for transmission. The pattern mapper 106 may map each bit in the string of bits 104 to a bit pattern to create a series 108 of bit patterns. The pattern mapper 106 may map one input bit into K output bits (i.e., the series 108 of bit patterns). Therefore, the series 108 of bit patterns may be expressed as K*R bps.

In an example, the pattern mapper 106 may create (e.g., generate) a bit pattern for each bit as indicated by each bit (e.g., binary value) in the string of bits 104. Each bit pattern may be a set of bits with a predetermined pattern of binary values. Each bit pattern (e.g., set of bits) may have a predetermined size (e.g., length) or include a predetermined number of bits. Mapping each bit in the string of bits 104 may include selecting a first bit pattern if a bit has a first binary value (e.g., 0) and selecting a second bit pattern if the bit has a second binary value (e.g., 1).

The pattern mapper 106 may concatenate the bit patterns selected for each bit in the string of bits 104 to create the series 108 of bit patterns. In some configurations, the bit patterns may be concatenated in the same order as the order of corresponding bits in the string of bits 104. Alternatively, the number of bit patterns (e.g., sets of bits) in the series 108 may be the same as the number of bits in the string of bits 104 (when K=1, for instance).

In some configurations, the pattern mapper 106 may perform the mapping with bit patterns of different sizes and/or in accordance with multiple rates. A pattern mapper 106 that is capable of utilizing bit patterns of different sizes and/or in accordance with multiple rates may be referred to as a variable-rate pattern mapper.

The pattern mapper 106 may map each bit in the string of bits 104 to a bit pattern to create a series 108 of bit patterns before modulation. As can be observed, the mapping may change the bit rate (e.g., throughput). The pattern mapper 106 may concatenate the bit patterns in the same order as the string of binary bits. The series 108 of concatenated bit patterns may be provided to the modulator 110.

The modulator 110 may generate a modulated signal 112 based on the series 108. The modulator 110 may use the series 108 of bit patterns to generate a series 108 of phase patterns. In some configurations, the modulation performed by the modulator 110 may be constant-envelope modulation. In other words, generating the modulated signal 112 may be based on constant-envelope modulation. Constant-envelope modulation (e.g., frequency-shift keying (FSK), Gaussian frequency-shift keying (GFSK), phase-shift keying (PSK), etc.) may be modulation that does not modulate signal amplitude.

One particular example of constant-envelope modulation is GFSK modulation. For instance, the modulator 110 may use GFSK modulation to generate the modulated signal 112 from the series 108 of concatenated phase patterns. For example, LE or LELR systems may use Gaussian Frequency-Shift Keying (GFSK) modulation with a bandwidth bit period product BT=0.5 (where B is bandwidth and T is a bit period). This particular sub-class of GFSK may be referred to as Gaussian Minimum Shift Keying (GMSK). The modulation index is between 0.45 and 0.55. In some configurations, a positive frequency deviation represents binary one and a negative frequency deviation represents binary zero.

The modulated signal 112 generated by the modulator 110 may be provided to the transmitter 114. In some configurations, the modulated signal 112 may include in-phase (I) and quadrature (Q) components (e.g., component signals). Accordingly, the modulated signal 112 may be an in-phase/quadrature (IQ) waveform in some examples.

The transmitter 114 may transmit the modulated signal 112 to the receiving communication device 118. For example, the transmitter 114 may filter and/or amplify the modulated signal 112, which may be provided to the one or more antennas 116a-n. The one or more antennas 116a-n may radiate the modulated signal 112.

The receiver 122 on the receiving communication device 118 may receive the signal transmitted by the transmitting communication device 102 via one or more antennas 120a-n. The receiver 122 may obtain a received modulated signal 124. For example, the receiver 122 may receive (via one or more antennas 120a-n), amplify and/or filter the signal received from the transmitting communication device 102 to produce the received modulated signal 124. The received modulated signal 124 may include I and Q components (e.g., component signals). Accordingly, the received modulated signal 124 may be an IQ waveform in some examples.

The receiver 122 may provide the received modulated signal 124 to the joint demodulator/demapper 126. It should be noted that although the receiver 122 and the joint demodulator/demapper 126 are depicted as separate components in FIG. 1, in another configuration, the joint demodulator/demapper 126 may be implemented within the receiver 122.

In a conventional approach, the receiving communication device 118 may first perform demodulation of the received modulated signal 124 (e.g., the GFSK symbols). The demodulated signal may then be demapped to generate the received bits 130 (e.g., the information bits). However, improvements may be achieved by performing a joint demodulation and demapping according to the described systems and methods. For example, the described joint demodulation and demapping may improve the bit error rate (BER) of the received signal.

The joint demodulator/demapper 126 may obtain the received modulated signal 124 (e.g., an IQ waveform). The joint demodulator/demapper 126 may determine a string of received bits 130 based on the received modulated signal 124. The joint demodulator/demapper 126 may combine functions of a demodulator (e.g., GFSK demodulator) and a pattern demapper.

The joint demodulator/demapper 126 may determine the string of received bits 130 based on bit patterns (and based on phase patterns that correspond to the bit patterns, for example) of the received modulated signal 124 and based on a stored accumulated phase 128. For instance, the joint demodulator/demapper 126 may utilize matched filtering to determine the pattern mapping. The joint demodulator/demapper 126 may also perform phase rotation of the received signal 124 based on the stored accumulated phase 128.

In some configurations, the joint demodulator/demapper 126 may demodulate and demap pattern-mapped and GFSK modulated signals 124 in the IQ domain. For example, the joint demodulator/demapper 126 may perform one or more of the following procedures in order to determine the string of received bits 130. In an implementation, the joint demodulator/demapper 126 may use the stored accumulated phase 128 in a decision feedback loop to reconstruct the initial phase at the beginning of a pattern. A matched filter in the IQ domain may be used to continue the demodulation process.

The joint demodulator/demapper 126 may perform a combined phase rotation and matched filtering. The phase rotation may compensate for the phase of the received modulated signal 124. The phase rotation may be performed using a stored accumulated phase 128. The joint demodulator/demapper 126 may perform matched filtering using the resulting phase to determine the pattern mapping of the received modulated signal 124.

Upon performing the combined phase rotation and matched filtering, the joint demodulator/demapper 126 may output the received bits 130. The joint demodulator/demapper 126 may then update the stored accumulated phase 128 based on the joint demapping and demodulation output. In a configuration, the stored accumulated phase 128 may be stored in memory. Therefore, the memory may store the up-to-date accumulated phase of the received modulated signal 124.

The joint demodulator/demapper 126 may determine the phase 128 from the output of the combined matched filtering and phase rotation. The joint demodulator/demapper 126 may then update the stored accumulated phase 128. The stored accumulated phase 128 may be fed back to perform a subsequent phase rotation of the received signal 124. Further details on performing a joint demapping and demodulation of the received signal based on the stored accumulated phase 128 are described in connection with FIG. 3.

It should be noted that switching the order of the phase rotation and the matched filtering may result in alternative implementations. In one implementation, matched filtering occurs before the phase rotation as described in connection with FIG. 4. In another implementation, the phase rotation based on the stored accumulated phase 128 occurs before matched filtering as described in connection with FIG. 5.

In an implementation, the received bits 130 may be provided to a decoder (not shown) for decoding. For example, the received bits 130 generated by the joint demodulator/demapper 126 may be soft input for a Viterbi decoder.

Figure 2:
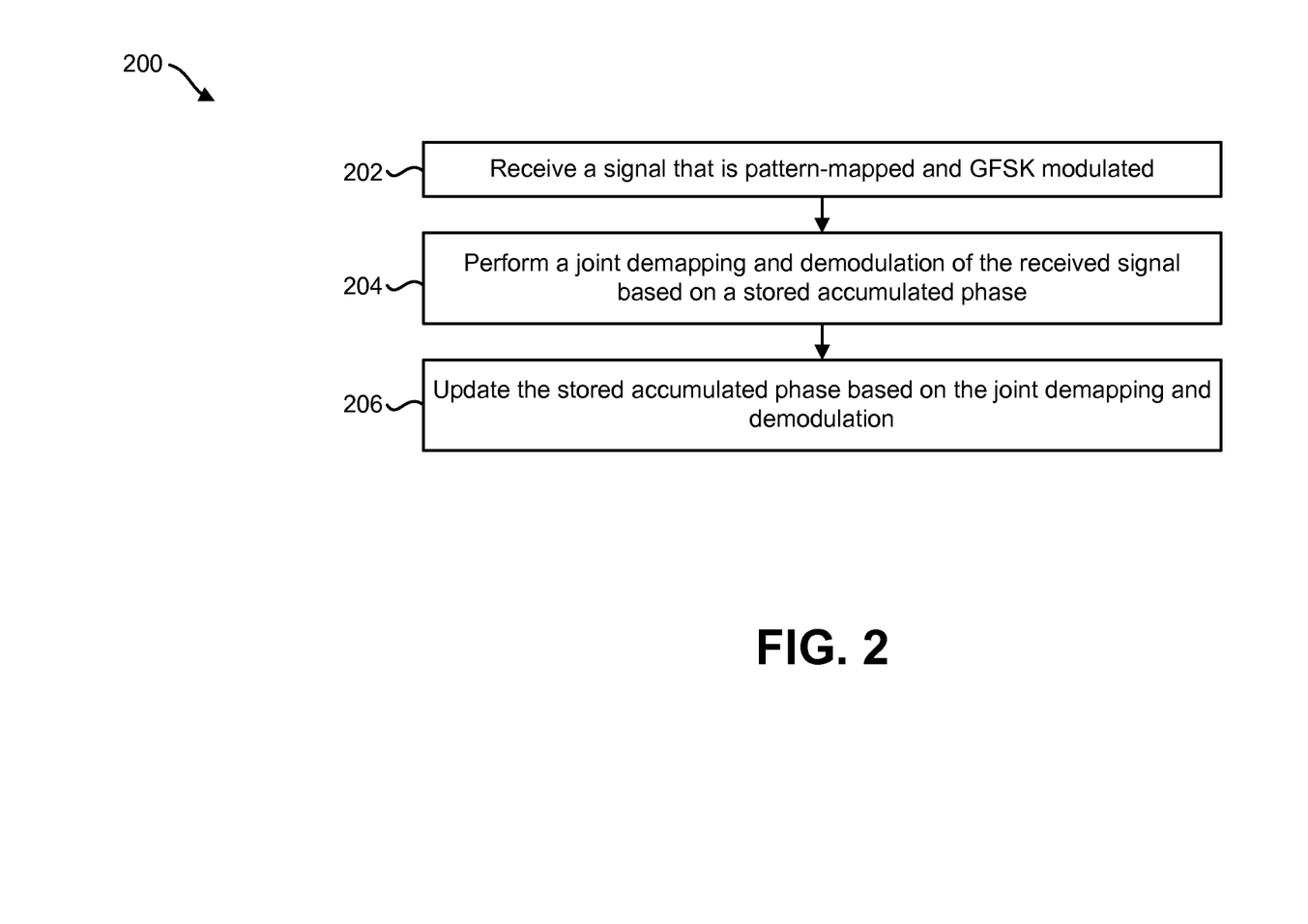
FIG. 2 is a flow diagram illustrating a method for joint demodulation and demapping.

FIG. 2 is a flow diagram illustrating a method 200 for joint demodulation and demapping. The method 200 may be performed by a receiving communication device 118. The receiving communication device 118 may receive 202 a signal 124 that is pattern-mapped and GFSK modulated. This may be accomplished as described above in connection with FIG. 1. For example, the receiving communication device 118 may receive (via one or more antennas 120a-n), amplify and/or filter a signal to produce the received modulated signal 124.

The receiving communication device 118 may perform 204 a joint demapping and demodulation of the received signal 124 based on a stored accumulated phase 128. This may be accomplished as described above in connection with FIG. 1. For example, the receiving communication device 118 may perform a combined phase rotation and matched filtering. The phase rotation may compensate for the phase of the received modulated signal 124. The phase rotation may be performed using the stored accumulated phase 128. The receiving communication device 118 may perform matched filtering using the resulting phase to determine the pattern mapping of the received modulated signal 124. Upon performing the combined phase rotation and matched filtering, the receiving communication device 118 may output the received bits 130.

The receiving communication device 118 may update 206 the stored accumulated phase 128 based on the joint demapping and demodulation output. This may be performed as described above in connection with FIG. 1. For example, the receiving communication device 118 may store the stored accumulated phase 128 in memory. The receiving communication device 118 may update the memory with the up-to-date accumulated phase of the received modulated signal 124.

Figure 3:
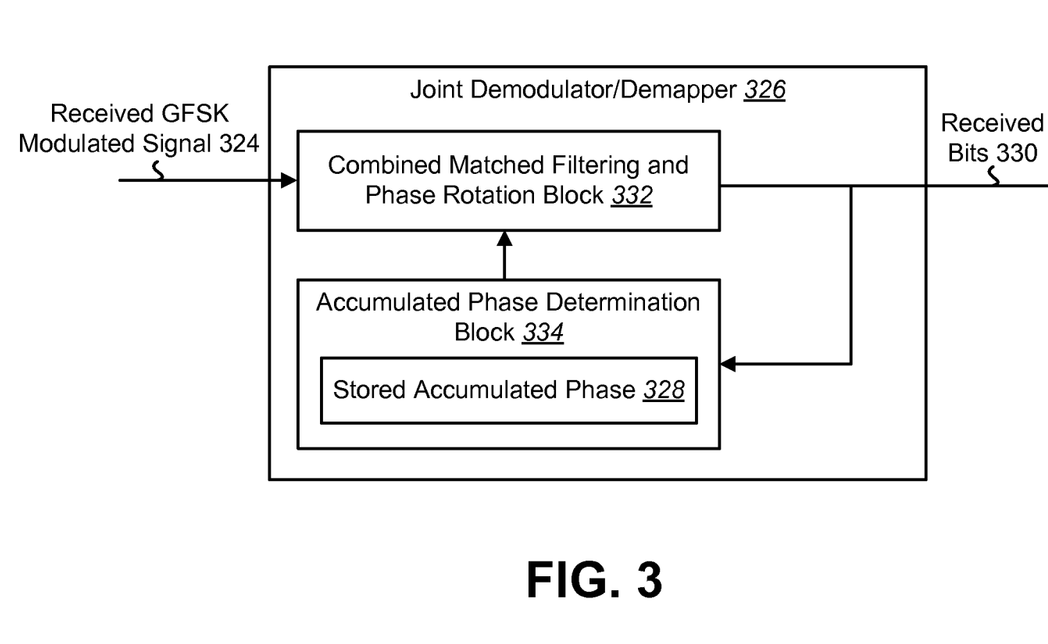
FIG. 3 is a block diagram illustrating one example of components that may be implemented for joint demodulation and demapping.

FIG. 3 is a block diagram illustrating one example of components that may be implemented for joint demodulation and demapping. In particular, FIG. 3 illustrates a joint demodulator/demapper 326 that includes a combined matched filtering and phase rotation block 332 and an accumulated phase determination block 334. One or more of these illustrated components may be included in the receiving communication device 118 described in connection with FIG. 1 in some configurations. For example, one or more of the illustrated components may be included in the receiver 122, in the joint demodulator/demapper 126 or both in some configurations.

One or more of the functions or procedures described in connection with FIG. 3 may be performed as part of joint demodulation and demapping. As described above, for example, the joint demodulator/demapper 326 may take LE modulated IQ values as input and may perform a joint demodulation/decoding operation to convert the IQ values to received data. For instance, the joint demodulator/demapper 326 may perform a combined matched filtering and phase rotation of the received GFSK modulated signal 324 (based on the stored accumulated phase 328) to determine a string of received bits 330 (e.g., a string of binary data including 1s and/or 0s).

In an implementation, the joint demodulation and demapping may include multi-symbol decision feedback demodulation. The baseband model of the GFSK modulated signal 324 is given by $$s(t) = \sqrt{\frac{E_S}{T}} e^{j\phi(t,I)}. \quad (1)$$

In Equation (1), $E_S$ is the symbol energy, T is the symbol duration, and $\phi(t,I)$ is the data dependent time-varying modulated phase with the information bit sequence I. The phase $\phi(t,I)$ is given by $$\phi(t, I) = 2\pi h \sum_{k=0}^{NQ-1} I[k]q(t - kT), \quad (2)$$

$$= \pi h \sum_{k=0}^{n-L} I[k] + 2\pi \sum_{k=n-L+1}^{n} I[k]q(t - kT),$$

$$nT \le t \le (n+1)T,$$

where I[k] is the k-th symbol, N is the total number of bits per packet and Q is the number of symbols representing a bit, thus NQ is the total number of symbols per packets, h is the modulation index, $q(t)=\int_0^t g(\tau)d\tau$, where g(t) is the Gaussian filter, which is the impulse response of the convolution of a Gaussian distribution and a rectangular pulse of period T, and L is the length of g(t) in terms of the symbol duration.

The Gaussian filter g(t) can be given by $$g(t) = \frac{1}{2T}\left[Q\left(2\pi B\frac{t-(L+1)\frac{T}{2}}{\sqrt{\log 2}}\right) - Q\left(2\pi B\frac{1-(L-1)\frac{T}{2}}{\sqrt{\log 2}}\right)\right], \quad (3)$$

where Q(·) is the Q-function, and B is a 3 dB bandwidth of the Gaussian filter.

The received GFSK modulated signal 324 is given by $$r(t)=s(t)e^{j\phi_0}+z(t), \quad (4)$$

where $\phi_0$ is the unknown initial phase and z(t) is the additive white Gaussian noise.

Sampling the received GFSK modulated signal 324 at symbol rate, $$r(nT)=s(nT)e^{j\phi_0}+z(nT), \quad (5)$$

$$r[n]=s[n]e^{j\phi_0}+z[n], \quad (6)$$

where r[n], s[n], z[n] denote the discrete samples. In an implementation, BT=0.5, L=3 is sufficient for modeling the ISI effect. Then, s[n] can be expressed as $$s[n] = \sqrt{\frac{E_S}{T}} e^{j\phi[n]}, \text{ with} \quad (7)$$

$$\phi[n] = \pi h \sum_{k=0}^{n-2} I[k] + 2\pi h q(T)(I[n-1] - I[n-2]),$$

$$= \phi_S[n] + \phi_E[n],$$

where, for n≥2, $$\phi_S[n] = \pi h \sum_{k=0}^{n-2} I[k], \quad (8)$$

$$\phi_E[n] = \begin{cases} 0, & I[n-1]I[n-2] = 1, \\ 4\pi h q(T), & I[n-1] = 1, I[n-2] = -1, \\ -4\pi h q(T), & I[n-2] = -1, I[n-2] = -1, \end{cases} \quad (9)$$

with $\phi_S[0]=\phi_S[1]=0$, $\phi_E[0]=0$, and $\phi_E[1]=2\pi h q(T)I[0]$.

It can be seen that $\phi_S[n]$ denotes the accumulated phase 328 of the first (n−1) symbols, and $\phi_E[n]$ denotes the ISI effect to the (n−2)-th symbol caused by the (n−1)-th symbol.

In the following description, the maximum likelihood estimation of the initial phase $\phi_0$ is described. A demodulation approach is discussed given such an estimation.

The maximum likelihood estimation of an information bit and the initial phase may be given by $$ML: \max_{\phi_0, I} Pr(r|s, \phi_0),  \quad (10)$$

$$\Rightarrow \max_{\phi_0, I} \exp\left\{-\frac{1}{2\sigma^2}\|r - se^{j\phi_0}\|^2\right\},$$

$$\Rightarrow \max_{\phi_0, I} \|r - se^{j\phi_0}\|^2,$$

$$\Rightarrow \max_{\phi_0, I} \text{Re}[s^H r e^{-j\phi_0}],$$

where r is the vector of the received signal samples, $[r[0], r[1], \ldots, r[mQ+1]]^T$, s is the vector of the transmitted signal samples, $[s[0], s[1], \ldots s[mQ+1]]^T$, which is a function of the information bits I, $\sigma^2$ is the noise variance, and $(\cdot)^H$ is the Hermitian operator.

It should be noted that from Equation (8), there is a 2 sample delay for decoding. In other words, $r[n+2]$ should be used to decode $I[n]$. It can be seen that $$\max_{\phi_0, I} \text{Re}[s^H r e^{-j\phi_0}] = \max_I |s^H r|, \quad (11)$$

and the optimum maximizer $\hat{\phi}_0$ satisfies $$e^{j\hat{\phi}_0} = \frac{s^H r}{|s^H r|}. \quad (12)$$

Expanding the metric in Equation (11), results in $$|s^H r| = \left|\sum_{n=0}^{mQ+1} r[n] s*[n]\right| = \left|\sum_{n=0}^{mQ+1} r[n] e^{-j\phi[n]}\right| \quad (13)$$

$$= \left|\sum_{n=0}^{(m-1)Q+1} r[n] e^{-j\phi[n]} + \sum_{n=(m-1)Q+2}^{mQ+1} r[n] e^{-j\phi[n]}\right|$$

$$= \left|e^{-j\phi_S[(m-1)Q+1]}\right. \cdot$$

$$\left(\sum_{n=0}^{(m-1)Q+1} r[n] e^{-j(\phi_S[n] - \phi_S[(m-1)Q+1])} e^{-j\phi_E[n]} + \right.$$

$$\left.\left.\sum_{n=(m-1)Q+2}^{mQ+1} r[n] e^{-j(\phi_S[n] - \phi_S[(m-1)Q+1])} e^{-j\phi_E[n]}\right)\right|$$

$$= \left|\sum_{n=0}^{(m-1)Q+1} r[n] e^{-j(\phi_S[n] - \phi_S[(m-1)Q+1])} e^{-j\phi_E[n]} + \right.$$

$$\left.\sum_{n=(m-1)Q+2}^{mQ+1} r[n] e^{-j(\phi_S[n] - \phi_S[(m-1)Q+1])} e^{-j\phi_E[n]}\right|$$

$$= |M_Q[m-1] + s_Q^H r_Q[m]|.$$

In Equation (13), m denotes the m-th information bit associating with the Q symbols, which correspond to the received samples $r[(m-1)Q+2], \ldots, r[mQ+1]$. The notation $M_Q[m-1]$ is defined as $$M_Q[m-1] = \sum_{n=0}^{(m-1)Q+1} r[n] e^{-j(\phi_S[n] - \phi_S[(m-1)Q+1])} e^{-j\phi_E[n]}. \quad (14)$$

The updating rule of $M_Q[m]$ given $M_Q[m-1]$ can be derived as $$M_Q[m] = (M_Q[m-1] + s_Q^H r_Q[m]) e^{j(\phi_S[mQ+1] - \phi_S[(m-1)Q+1])}. \quad (15)$$

In Equation (15), $r_Q[m]$ and $s_Q$ are vectors defined as $$r_Q[m] = \begin{bmatrix} r[(m-1)Q+2] \\ r[(m-1)Q+3] \\ \vdots \\ r[mQ+1] \end{bmatrix}, \quad (16)$$

$$s_Q = \begin{bmatrix} e^{j(\phi_S[(m-1)Q+2] - \phi_S[(m-1)Q+1])} e^{j\phi_E[(m-1)Q+2]} \\ e^{j(\phi_S[(m-1)Q+3] - \phi_S[(m-1)Q+1])} e^{j\phi_E[(m-1)Q+3]} \\ \vdots \\ e^{j(\phi_S[mQ+1] - \phi_S[(m-1)Q+1])} e^{j\phi_E[mQ+1]} \end{bmatrix}.$$

Thus, the ML detection in Equation (11) can be written as $$\max_I |s^H r| \Rightarrow \max_I |M_Q[m-1] + s_Q^H r_Q[m]|. \quad (17)$$

The symbols $I[mQ], I[mQ+1], \ldots, I[mQ+Q-1]$ associated with the m-th information bit $B[m]$ may be denoted as $I_m$. Considering a decision feedback scenario, the information bits $B[0], \ldots, B[m-1]$ have been demodulated. The maximization in Equation (17) may be expressed as $$\max_{I_m} \text{Re}[M_Q^*[m-1] s_Q^H r_Q[m]], \quad (18)$$

since $M_Q[m-1]$ contains only $I_0, \ldots, I_{m-1}$. Iteratively applying the updating rule of Equation (15) and the maximization of Equation (18), the decision feedback demodulation algorithm may be according to Table 1.

TABLE 1

Multi-Symbol GFSK Demodulation Algorithm (i) Initial phase estimation using training sequence $\{I_{tr}[m]\}_{m=0}^{N_{tr}-1}$:
 1. Initialize $M_{tr}[0] = r_{tr}[0] + r_{tr}[1] e^{-j\phi_E[1]}$.
 2. For m = 0 to $N_{tr} - 1$
   $M_{tr}[m+1] = w M_{tr}[m] e^{j\pi h I_{tr}[m]} + r_{tr}[m+2] e^{-j\phi_E[m+2]}$.
 end
(ii) Phase tracking and multi-symbol detection:
 1. Initialize $M_Q[0] = M_{tr}[N_{tr}]$.
 2. For m = 0 to $N_B - 1$
   $\hat{B}[m] = \hat{i} = \arg\max_i \text{Re}\{M_Q^*[m](S_Q^{(i)})^H r_Q[m+1]\}$
   $M_Q[m+1] = (M_Q[m] + (s_Q^{(\hat{i})})^H r_Q[m+1]) \cdot e^{j(\phi_S[(m+1)Q+1] - \phi_S[mQ+1])}$
 end It should be noted that in Table (1), $s_Q^{(i)}$ denotes the matched filter corresponding to the i-th hypothesis, $r_Q$ denotes the output of the phase rotation and $M_Q[m+1]$ corresponds to the updated stored accumulated phase 328 (which may be performed by the accumulated phase determination block 334. $\hat{B}[m]$ corresponds to the received bits 330 that are output by the combined matched filtering and phase rotation block 332.

For the maximum likelihood (ML) estimation of the initial phase, using Equation (12) and Equation (13), the ML estimation of $\phi_0$ may be derived to be $$e^{j\hat{\phi}_0} = e^{-j\phi_S[(m-1)Q+1]}(M_Q[m-1]+s_Q^H r_Q[m]). \quad (19)$$

Comparing Equation (15) and Equation (19), $$M_Q[m] = e^{j\hat{\phi}_0} e^{j\phi_S[mQ+1]}, \quad (20)$$

which means the phase accumulated up to the (mQ+1)-th sample. With this the phase of the next Q samples may be compensated for demodulating the next bit. In other words, if the estimated initial phase is accurate enough, the resulting performance may approach a coherent demodulation.

For Q=1, Equation (15) becomes $$M_1[m] = M_1[m-1]e^{j\pi h \hat{I}[m-1]} + r[m+1]e^{j\phi_E[m+1]}. \quad (21)$$

The result of Equation (21) may be useful for training the initial phase before symbol estimation if a training sequence is available.

As indicated by the algorithm of Table (1), given the initial phase estimate $\hat{\phi}_0$, the ML demodulation can be determined by first compensating the phase of the received samples, which are then correlated with the matched sequences of each hypothesis. That is, $$\hat{i} = \arg\max_i \mathrm{Re}\{M_Q^*[m-1](s_Q^{(i)})^H r_{Q[m]}\}, \quad (22)$$

where $s_Q^{(i)}$ denotes the matched filter corresponding to the i-th hypothesis.

For interpreting $M_Q[\cdot]$, the true symbols may be denoted as $I[k]$, and the estimated symbols may be denoted as $\hat{I}[k]$. The notations $\hat{\phi}_m[n-2]$, $\hat{\phi}_e[n-1]$ are accordingly defined by the estimated symbols. Then, $$M[P-2] = \sum_{n=1}^{P} \hat{r}[n] e^{j(\hat{\phi}_m[P-2]-\hat{\phi}_m[n-2])}, \quad (23)$$

where $$\hat{r}[n] = r[n] e^{-j\hat{\phi}_e[n-1]}$$
$$= (e^{j(\phi_m[n-2]+\phi_e[n-1]+\phi_0)+z[n]}) e^{-j\hat{\phi}_e[n-1]}. \quad (24)$$

Therefore, M[P−2] can be expressed as $$M[P-2] = e^{j\phi_0} e^{j\hat{\phi}_m[P-2]} \cdot \sum_{n=1}^{P} e^{j(\phi_m[P-2]-\hat{\phi}_m[n-2])} e^{j(\phi_e[n-1]-\hat{\phi}_e[n-1])} + \tilde{z}[P-2], \quad (25)$$

where $\tilde{z}[P-2] = \sum_{n=1}^{P} z[n] e^{-j\hat{\phi}_e[n-1]} e^{j(\hat{\phi}_m[P-2]-\hat{\phi}_m[n-2])}$. It should be noted that when the SNR is large and if the estimation is mostly correct, then M[P−2] is approximately the initial phase $e^{j\phi_0}$ times a constant $Pe^{j\hat{\phi}_m[P-2]}$, which is the accumulated phase 328 up to the (P−2)-th symbol.

From Equation (25), when the index P increases, the variance of the equivalent noise $\tilde{z}[P-2]$ becomes $P\sigma_z^2$, where $\sigma_z^2$ is the variance of z[n], while the amplitude of M[P−2] becomes P. Thus, equivalently, the estimation error of $e^{j\phi_0}$ is decreasing as P increases. The growth of the amplitude of M[P−2] with P also justifies the need of a forgetting factor.

In a special case, when the information bits B[m] are encoded by the Manchester pattern, the algorithm in Table (1) can be further simplified. For the following Manchester encoding with spreading factor Q=4, the encoded symbols are given by $$I[4m:4m+3] = \begin{cases} 1, & 1, & -1, & -1, & \text{for } B[m]=0 \\ -1, & -1, & 1, & 1, & \text{for } B[m]=1 \end{cases}. \quad (26)$$

It can be shown that the hypotheses $s_Q^{(0)}$ and $s_Q^{(1)}$ are complex conjugate to each other. In other words, $$s_Q^{(0)} = s_Q^{(1)*}. \quad (27)$$

Therefore, $$(s_Q^{(0)})^H r_Q[m+1] = y_1 - jy_2, \quad (28)$$

$$(s_Q^{(1)})^H r_Q[m+1] = y_1 + jy_2, \quad (29)$$

where $$y_1 = (\mathrm{Re}[s_Q^{(0)}])^H r_Q[m+1]$$

and $$y_2 = (\mathrm{Im}[s_Q^{(0)}])^H r_Q[m+1].$$

The ML detection $$\mathrm{Re}[M_Q^*(s_Q^{(0)})^H r_Q[m+1]] \gtrless_1^0 \mathrm{Re}[M^*(s_Q^{(1)})^H r_Q[m+1]] \quad (30)$$

becomes $$\mathrm{Im}[M_Q^* y_2] \lessgtr_1^0 0. \quad (31)$$

It should be noted that for both hypotheses, the summation of the symbols in each symbol sequence is zero. Thus, the accumulated phase $\phi_S[mQ+1]-\phi_S[(m-1)Q+1]=0$ for all m. The Manchester GFSK Demodulation Algorithm is summarized in Table (2).

TABLE 2

| Manchester GFSK Demodulation Algorithm |
| --- |
| 1. Initialize $M_Q$ (by training sequence or previous received signal r[1]).<br>2. For m = 0 to $N_B - 1$<br>    $y_1 = (\mathrm{Re}[s_Q^{(0)}])^H r_Q[m+1]$<br>    $y_2 = (\mathrm{Im}[s_Q^{(0)}])^H r_Q[m+1]$<br>    if $\mathrm{Im}[M_Q^* y_2] > 0$<br>        B[m] = 0<br>        $M_Q = M_Q + y_1 - jy_2$<br>    else |

TABLE 2-continued

Manchester GFSK Demodulation Algorithm

```
        B[m] = 1
        M_Q = M_Q + y_1 + jy_2
    end if
end for
```

Figure 4:
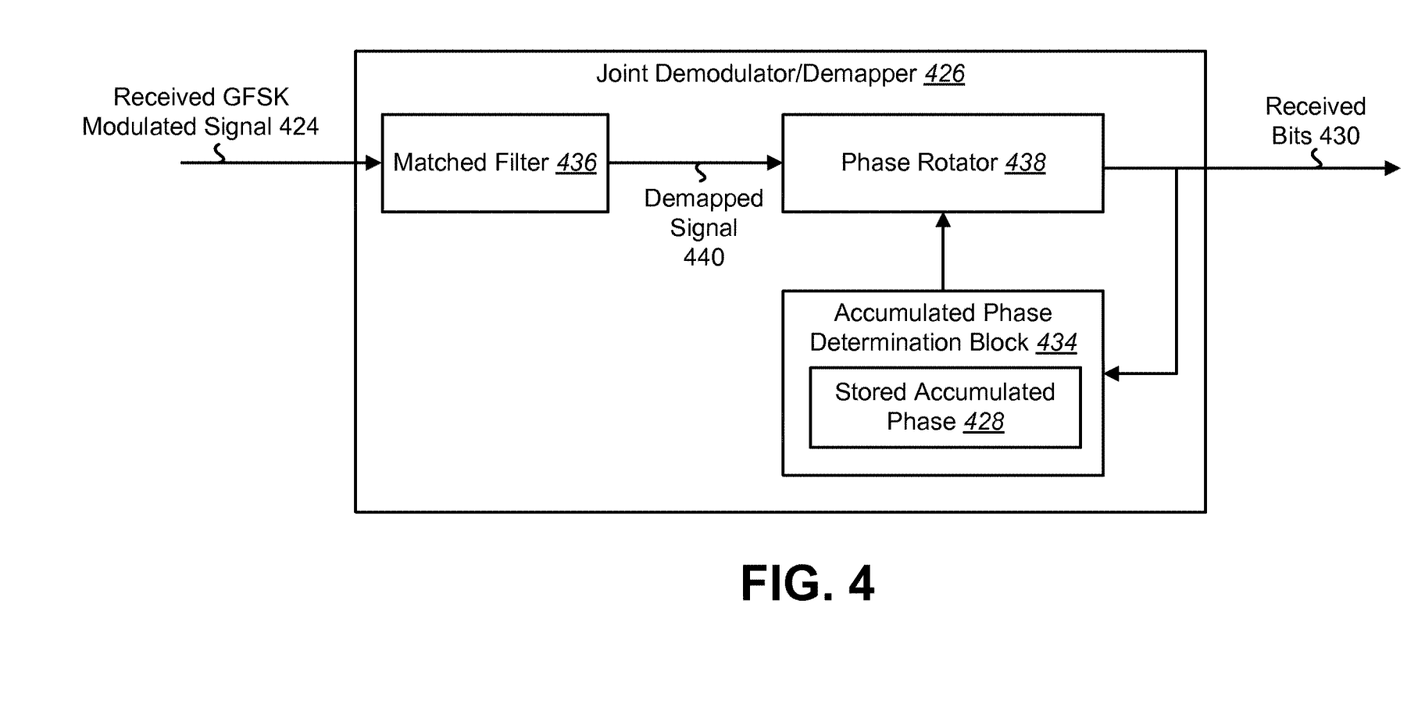
FIG. 4 is a block diagram illustrating one example of components that may be included in a joint demodulator/demapper.

FIG. 4 is a block diagram illustrating one example of components that may be included in a joint demodulator/demapper 426. The joint demodulator/demapper 426 includes a matched filter 436, a phase rotator 438 and an accumulated phase determination block 434. In the implementation depicted in FIG. 4, matched filtering occurs before the phase rotation based on the stored accumulated phase 428.

The matched filter 436 may receive the received GFSK modulated signal 424. The matched filter 436 may perform matched filtering to determine the pattern mapping of the received GFSK modulated signal 424. This may be accomplished as described in connection with FIG. 3. The matched filter 436 may output a demapped signal 440.

The phase rotator 438 may receive the demapped signal 440. The phase rotator 438 may also receive a stored accumulated phase 428. The phase rotator 438 may perform phase rotation on the demapped signal 440 based on the stored accumulated phase 428. This may be accomplished as described in connection with FIG. 3. At this point, the received GFSK modulated signal 424 is demodulated and demapped. The phase rotator 438 may output received bits 430.

The accumulated phase determination block 434 may update the stored accumulated phase 428 based on the joint demapping and demodulation. This may be accomplished as described in connection with FIG. 3. It should be noted that the stored accumulated phase 428 may be stored in memory. In an implementation, the accumulated phase determination block 434 may update the memory upon determining the accumulated phase 428.

Figure 5:
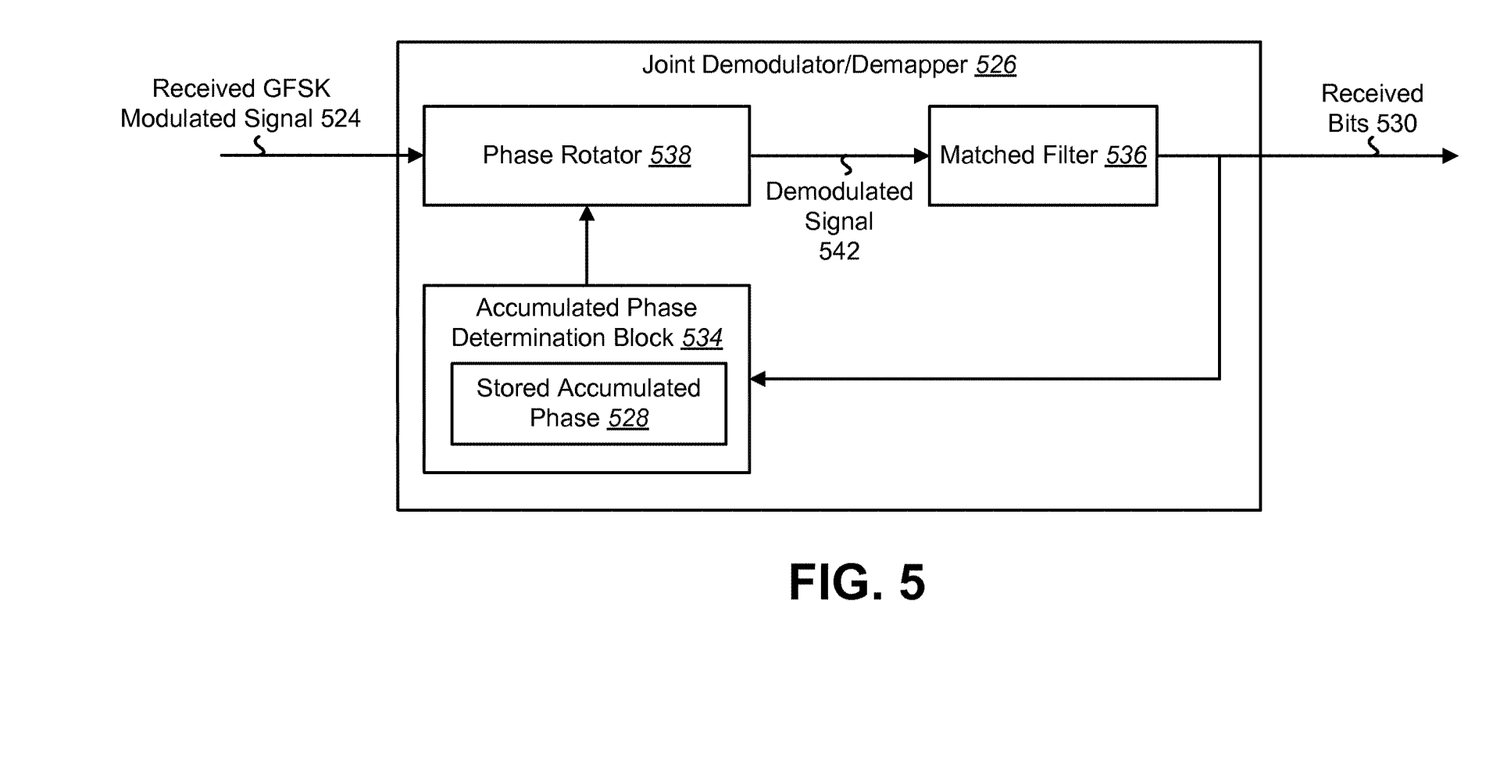
FIG. 5 is a block diagram illustrating another example of components that may be included in a joint demodulator/demapper.

FIG. 5 is a block diagram illustrating another example of components that may be included in a joint demodulator/demapper 526. The joint demodulator/demapper 526 includes a matched filter 536, a phase rotator 538 and an accumulated phase determination block 534. In the implementation depicted in FIG. 5, phase rotation based on the stored accumulated phase 528 occurs before matched filtering.

The phase rotator 538 may receive the received GFSK modulated signal 524. The phase rotator 538 may also receive a stored accumulated phase 528. The phase rotator 538 may perform phase rotation on the received GFSK modulated signal 524 based on the stored accumulated phase 528. This may be accomplished as described in connection with FIG. 3. The phase rotator 538 may output a demodulated signal 542.

The matched filter 536 may receive the demodulated signal 542. The matched filter 536 may perform matched filtering to determine the pattern mapping of the demodulated signal 542. This may be accomplished as described in connection with FIG. 3. At this point, the received GFSK modulated signal 524 is demodulated and demapped. The matched filter 536 may output received bits 530.

The accumulated phase determination block 534 may update the stored accumulated phase 528 based on the joint demapping and demodulation. This may be accomplished as described in connection with FIG. 3.

Figure 6:
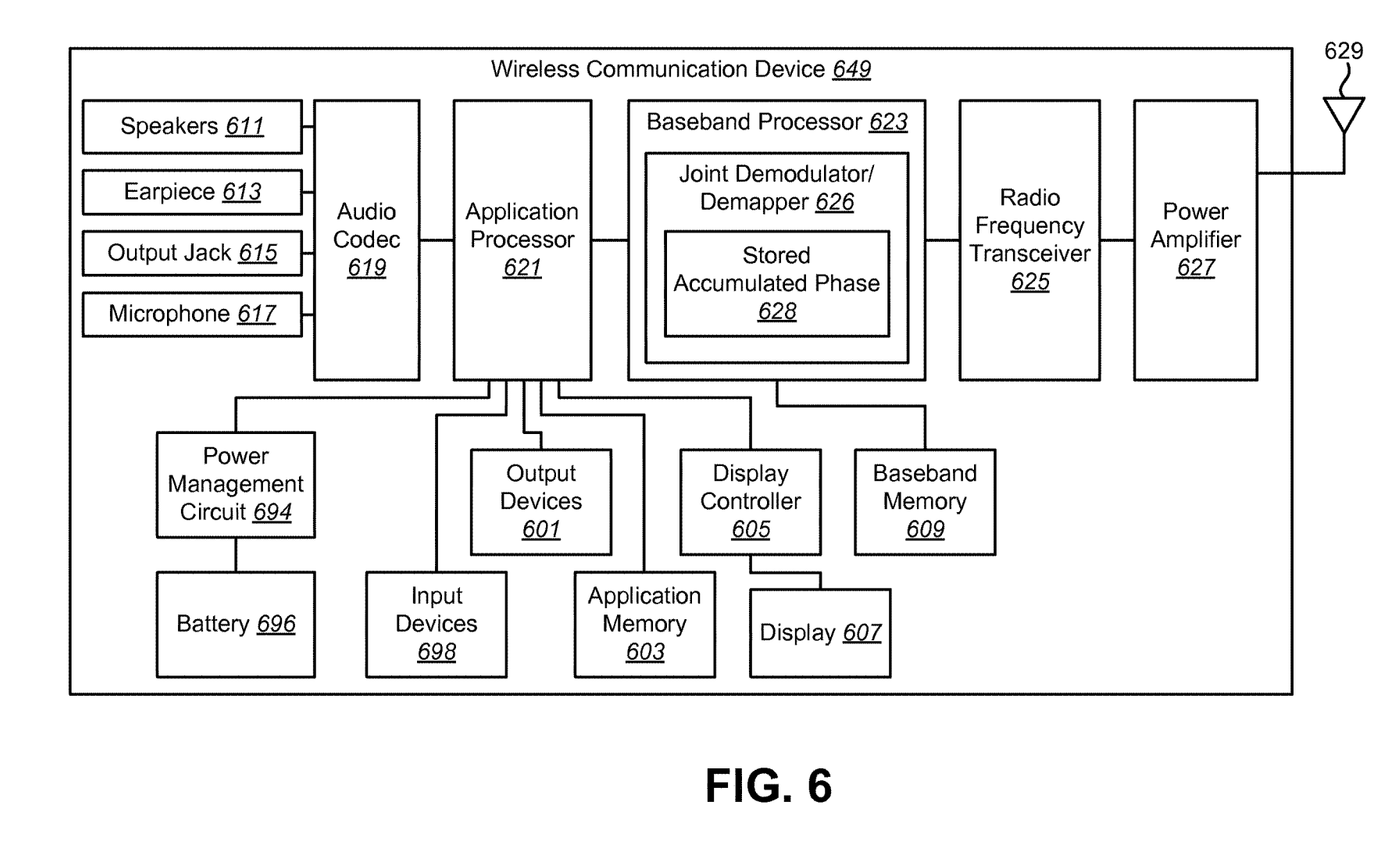
FIG. 6 is a block diagram illustrating another more specific configuration of a wireless communication device in which systems and methods for joint demodulation and demapping may be implemented.

FIG. 6 is a block diagram illustrating another more specific configuration of a wireless communication device 649 in which systems and methods for joint demodulation and demapping may be implemented. The wireless communication device 649 illustrated in FIG. 6 may be an example of one or more of the transmitting communication device 102 and the receiving communication device 118 described in connection with one or more of FIGS. 1-5. The wireless communication device 649 may include an application processor 621. The application processor 621 generally processes instructions (e.g., runs programs) to perform functions on the wireless communication device 649. The application processor 621 may be coupled to an audio coder/decoder (codec) 619.

The audio codec 619 may be used for coding and/or decoding audio signals. The audio codec 619 may be coupled to at least one speaker 611, an earpiece 613, an output jack 615 and/or at least one microphone 617. The speakers 611 may include one or more electro-acoustic transducers that convert electrical or electronic signals into acoustic signals. For example, the speakers 611 may be used to play music or output a speakerphone conversation, etc. The earpiece 613 may be another speaker or electro-acoustic transducer that can be used to output acoustic signals (e.g., speech signals) to a user. For example, the earpiece 613 may be used such that only a user may reliably hear the acoustic signal. The output jack 615 may be used for coupling other devices to the wireless communication device 649 for outputting audio, such as headphones. The speakers 611, earpiece 613 and/or output jack 615 may generally be used for outputting an audio signal from the audio codec 619. The at least one microphone 617 may be an acousto-electric transducer that converts an acoustic signal (such as a user's voice) into electrical or electronic signals that are provided to the audio codec 619.

The application processor 621 may also be coupled to a power management circuit 694. One example of a power management circuit 694 is a power management integrated circuit (PMIC), which may be used to manage the electrical power consumption of the wireless communication device 649. The power management circuit 694 may be coupled to a battery 696. The battery 696 may generally provide electrical power to the wireless communication device 649. For example, the battery 696 and/or the power management circuit 694 may be coupled to at least one of the elements included in the wireless communication device 649.

The application processor 621 may be coupled to at least one input device 698 for receiving input. Examples of input devices 698 include infrared sensors, image sensors, accelerometers, touch sensors, keypads, etc. The input devices 698 may allow user interaction with the wireless communication device 649. The application processor 621 may also be coupled to one or more output devices 601. Examples of output devices 601 include printers, projectors, screens, haptic devices, etc. The output devices 601 may allow the wireless communication device 649 to produce output that may be experienced by a user.

The application processor 621 may be coupled to application memory 603. The application memory 603 may be any electronic device that is capable of storing electronic information. Examples of application memory 603 include double data rate synchronous dynamic random access memory (DDR SDRAM), synchronous dynamic random access memory (SDRAM), flash memory, etc. The application memory 603 may provide storage for the application processor 621. For instance, the application memory 603 may store data and/or instructions for the functioning of programs that are run on the application processor 621.

The application processor 621 may be coupled to a display controller 605, which in turn may be coupled to a display 607. The display controller 605 may be a hardware block that is used to generate images on the display 607. For example, the display controller 605 may translate instructions and/or data from the application processor 621 into images that can be presented on the display 607. Examples of the display 607 include liquid crystal display (LCD) panels, light emitting diode (LED) panels, cathode ray tube (CRT) displays, plasma displays, etc.

The application processor 621 may be coupled to a baseband processor 623. The baseband processor 623 generally processes communication signals. For example, the baseband processor 623 may demodulate and/or decode received signals. Additionally or alternatively, the baseband processor 623 may encode and/or modulate signals in preparation for transmission.

The baseband processor 623 may include a joint demodulator/demapper 626. The joint demodulator/demapper 626 may be an example of one or more of the joint demodulators/demappers 126, 326, 426, 526 described above. The joint demodulator/demapper 626 may perform a joint demapping and demodulation of a received signal based on a stored accumulated phase 628.

The baseband processor 623 may be coupled to baseband memory 609. The baseband memory 609 may be any electronic device capable of storing electronic information, such as SDRAM, DDRAM, flash memory, etc. The baseband processor 623 may read information (e.g., instructions and/or data) from and/or write information to the baseband memory 609. Additionally or alternatively, the baseband processor 623 may use instructions and/or data stored in the baseband memory 609 to perform communication operations.

The baseband processor 623 may be coupled to a radio frequency (RF) transceiver 625. The RF transceiver 625 may be coupled to a power amplifier 627 and one or more antennas 629. The RF transceiver 625 may transmit and/or receive radio frequency signals. For example, the RF transceiver 625 may transmit an RF signal using a power amplifier 627 and at least one antenna 629. The RF transceiver 625 may also receive RF signals using the one or more antennas 629.

Figure 7:
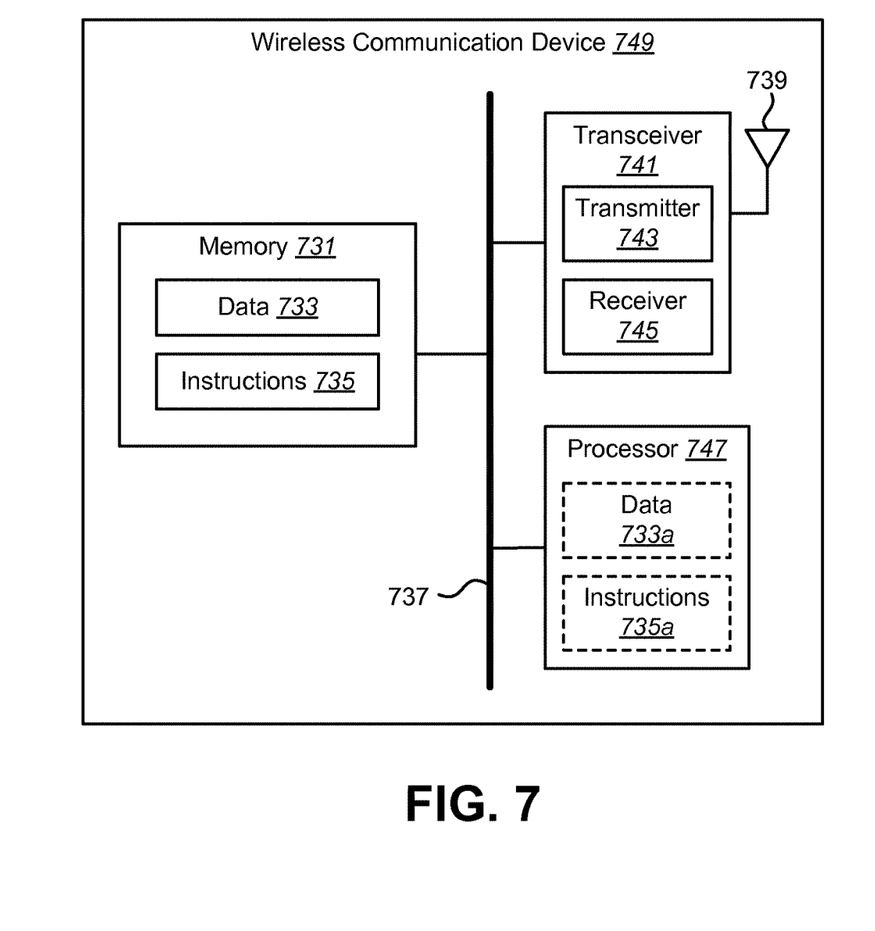
FIG. 7 illustrates certain components that may be included within a wireless communication device.

FIG. 7 illustrates certain components that may be included within a wireless communication device 749. The wireless communication device 749 described in connection with FIG. 7 may be an example of and/or may be implemented in accordance with one or more of the transmitting communication device 102, the receiving communication device 118 and the wireless communication device 649 described in connection with one or more of FIGS. 1-6.

The wireless communication device 749 includes a processor 747. The processor 747 may be a general purpose single- or multi-chip microprocessor (e.g., an ARM), a special purpose microprocessor (e.g., a digital signal processor (DSP)), a microcontroller, a programmable gate array, etc. The processor 747 may be referred to as a central processing unit (CPU). Although just a single processor 747 is shown in the wireless communication device 749 of FIG. 7, in an alternative configuration, a combination of processors (e.g., an ARM and DSP) could be used.

The wireless communication device 749 also includes memory 731 in electronic communication with the processor 747 (i.e., the processor 747 can read information from and/or write information to the memory 731). The memory 731 may be any electronic component capable of storing electronic information. The memory 731 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 733 and instructions 735 may be stored in the memory 731. The instructions 735 may include one or more programs, routines, sub-routines, functions, procedures, code, etc. The instructions 735 may include a single computer-readable statement or many computer-readable statements. The instructions 735 may be executable by the processor 747 to implement the method 200 described above and/or one or more of the functions described in connection with FIGS. 1-6. Executing the instructions 735 may involve the use of the data 733 that is stored in the memory 731. FIG. 7 shows some instructions 735a and data 733a being loaded into the processor 747.

The wireless communication device 749 may also include a transmitter 743 and a receiver 745 to allow transmission and reception of signals between the wireless communication device 749 and a remote location (e.g., a base station). The transmitter 743 and receiver 745 may be collectively referred to as a transceiver 741. An antenna 739 may be electrically coupled to the transceiver 741. The wireless communication device 749 may also include (not shown) multiple transmitters, multiple receivers, multiple transceivers and/or multiple antennas.

The various components of the wireless communication device 749 may be coupled together by one or more buses, which may include a power bus, a control signal bus, a status signal bus, a data bus, etc. For simplicity, the various buses are illustrated in FIG. 7 as a bus system 737.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication, comprising:
   receiving a signal that is pattern-mapped and Gaussian frequency-shift keying (GFSK) modulated; and
   performing a joint demapping and demodulation of the received signal based on a stored accumulated phase, wherein performing the joint demapping and demodulation of the received signal comprises performing a combined matched filtering and phase rotation of the received signal.

2. The method of claim 1, further comprising updating the stored accumulated phase based on the joint demapping and demodulation.

3. The method of claim 1, wherein the matched filtering determines the pattern mapping of the received signal, and the phase rotation of the received signal is based on the stored accumulated phase.

4. The method of claim 3, wherein the stored accumulated phase is determined from an output of the combined matched filtering and phase rotation.

5. The method of claim 3, wherein performing a combined matched filtering and phase rotation of the received signal comprises:
   performing phase rotation using the stored accumulated phase to compensate for a phase of the received signal; and
   performing matched filtering using a resulting phase of the phase rotation to determine an output bit.

6. The method of claim 3, wherein the phase rotation based on the stored accumulated phase occurs before matched filtering.

7. The method of claim 3, wherein matched filtering occurs before the phase rotation based on the stored accumulated phase.

8. The method of claim 1, wherein the stored accumulated phase is fed back to perform phase rotation of the received signal.

9. The method of claim 1, performing the joint demapping and demodulation of the received signal further comprises generating a soft input for a Viterbi decoder.

10. A wireless communication device, comprising:
    a receiver configured to receive a signal that is pattern-mapped and Gaussian frequency-shift keying (GFSK) modulated; and
    a joint demodulator/demapper configured to perform a joint demapping and demodulation of the received signal based on a stored accumulated phase, wherein performing the joint demapping and demodulation of the received signal comprises performing a combined matched filtering and phase rotation of the received signal.

11. The wireless communication device of claim 10, wherein the joint demodulator/demapper is further configured to update the stored accumulated phase based on the joint demapping and demodulation.

12. The wireless communication device of claim 10, wherein the matched filtering determines the pattern mapping of the received signal, and the phase rotation of the received signal is based on the stored accumulated phase.

13. The wireless communication device of claim 12, wherein the stored accumulated phase is determined from an output of the combined matched filtering and phase rotation.

14. The wireless communication device of claim 12, wherein performing a combined matched filtering and phase rotation of the received signal comprises:
performing phase rotation using the stored accumulated phase to compensate for a phase of the received signal; and
performing matched filtering using a resulting phase of the phase rotation to determine an output bit.

15. The wireless communication device of claim 12, wherein the phase rotation based on the stored accumulated phase occurs before matched filtering.

16. The wireless communication device of claim 12, wherein matched filtering occurs before the phase rotation based on the stored accumulated phase.

17. The wireless communication device of claim 10, wherein the stored accumulated phase is fed back to perform phase rotation of the received signal.

18. An apparatus for wireless communication, comprising:
means for receiving a signal that is pattern-mapped and Gaussian frequency-shift keying (GFSK) modulated; and
means for performing a joint demapping and demodulation of the received signal based on a stored accumulated phase, wherein the means for performing the joint demapping and demodulation of the received signal comprise means for performing a combined matched filtering and phase rotation of the received signal.

19. The apparatus of claim 18, further comprising means for updating the stored accumulated phase based on the joint demapping and demodulation.

20. The apparatus of claim 18, wherein the matched filtering determines the pattern mapping of the received signal, and the phase rotation of the received signal is based on the stored accumulated phase.

21. The apparatus of claim 20, wherein the stored accumulated phase is determined from an output of the combined matched filtering and phase rotation.

22. The apparatus of claim 20, wherein the means for performing a combined matched filtering and phase rotation of the received signal comprise:
means for performing phase rotation using the stored accumulated phase to compensate for a phase of the received signal; and
means for performing matched filtering using a resulting phase of the phase rotation to determine an output bit.

23. The apparatus of claim 20, wherein matched filtering occurs before the phase rotation based on the stored accumulated phase.

24. The apparatus of claim 18, wherein the stored accumulated phase is fed back to perform phase rotation of the received signal.

25. A computer-program product for wireless communication, comprising a non-transitory tangible computer-readable medium having instructions thereon, the instructions comprising:
code for causing a wireless communication device to receive a signal that is pattern-mapped and Gaussian frequency-shift keying (GFSK) modulated; and
code for causing the wireless communication device to perform a joint demapping and demodulation of the received signal based on a stored accumulated phase, wherein the code for causing the wireless communication device to perform the joint demapping and demodulation of the received signal comprises code for causing the wireless communication device to perform a combined matched filtering and phase rotation of the received signal.

26. The computer-program product of claim 25, further comprising code for causing the wireless communication device to update the stored accumulated phase based on the joint demapping and demodulation.

27. The computer-program product of claim 25, wherein the matched filtering determines the pattern mapping of the received signal, and the phase rotation of the received signal is based on the stored accumulated phase.

28. The computer-program product of claim 27, wherein the stored accumulated phase is determined from an output of the combined matched filtering and phase rotation.

29. The computer-program product of claim 27, wherein the code for causing the wireless communication device to perform a combined matched filtering and phase rotation of the received signal comprises:
code for causing the wireless communication device to perform phase rotation using the stored accumulated phase to compensate for a phase of the received signal; and
code for causing the wireless communication device to perform matched filtering using a resulting phase of the phase rotation to determine an output bit.

30. The computer-program product of claim 25, wherein the stored accumulated phase is fed back to perform phase rotation of the received signal.

* * * * *